United States Patent
Blackburn et al.

(10) Patent No.: US 12,181,719 B2
(45) Date of Patent: Dec. 31, 2024

(54) OPTICAL FIBER ASSEMBLIES AND METHODS OF FORMING THE SAME

(71) Applicant: CORNING RESEARCH & DEVELOPMENT CORPORATION, Corning, NY (US)

(72) Inventors: James Daniel Blackburn, Conover, NC (US); Xiaole Cheng, Painted Post, NY (US); John Patrick Lammers, Austin, TX (US); Darrin Max Miller, Hickory, NC (US); Stephan Toepper, Hickory, NC (US)

(73) Assignee: Corning Research & Development Corporation, Corning, NY (US)

( * ) Notice: Subject to any disclaimer, the term of this patent is extended or adjusted under 35 U.S.C. 154(b) by 0 days.

(21) Appl. No.: 17/988,105

(22) Filed: Nov. 16, 2022

(65) Prior Publication Data
US 2023/0168440 A1 Jun. 1, 2023

Related U.S. Application Data

(60) Provisional application No. 63/284,086, filed on Nov. 30, 2021.

(51) Int. Cl.
*G02B 6/38* (2006.01)
*B29D 11/00* (2006.01)

(52) U.S. Cl.
CPC ........ *G02B 6/3861* (2013.01); *B29D 11/0075* (2013.01)

(58) Field of Classification Search
CPC .............. G02B 6/3861; B29D 11/0075
See application file for complete search history.

(56) References Cited

U.S. PATENT DOCUMENTS

| 4,984,865 | A | 1/1991 | Lee et al. |
| 5,000,367 | A | 3/1991 | Bottum |
| 6,960,026 | B2 * | 11/2005 | Brun ..................... G02B 6/32 |
| | | | 385/83 |
| 7,147,384 | B2 | 12/2006 | Hardcastle et al. |
| 8,696,215 | B1 | 4/2014 | Fewkes et al. |
| 8,702,322 | B1 | 4/2014 | Danley et al. |
| 9,417,397 | B2 | 8/2016 | Kobyakov et al. |
| 9,733,435 | B2 | 8/2017 | Fewkes et al. |
| 9,791,637 | B2 | 10/2017 | Danley et al. |

(Continued)

FOREIGN PATENT DOCUMENTS

| JP | 4070098 B2 | 4/2008 |
| JP | 2021-039296 A | 3/2021 |

OTHER PUBLICATIONS

International Search Report and Written Opinion of the International Searching Authority; PCT/US2022/050205; dated Feb. 24, 2023; 12 pages; European Patent Office.

*Primary Examiner* — Sung H Pak
*Assistant Examiner* — Hoang Q Tran
(74) *Attorney, Agent, or Firm* — Adam R. Weeks

(57) ABSTRACT

Methods of forming an optical fiber assembly involve placing an adhesive in a ferrule assembly, heating the ferrule assembly through thermal induction, inserting an optical fiber into the ferrule bore during or after the heating step, and securing the optical fiber to the ferrule assembly using the adhesive. The thermal induction causes the adhesive to efficiently take or maintain a melted form to allow the optical fiber insertion.

21 Claims, 6 Drawing Sheets

(56) References Cited

U.S. PATENT DOCUMENTS

| | | |
|---|---|---|
| 10,215,930 B2 | 2/2019 | Mullaney et al. |
| 2003/0133671 A1 | 7/2003 | Murray et al. |
| 2014/0321811 A1* | 10/2014 | Miller .................. G02B 6/3833 156/247 |
| 2015/0219860 A1* | 8/2015 | Danley ................ G02B 6/3854 156/66 |
| 2015/0331202 A1 | 11/2015 | Rosson |
| 2018/0059335 A1 | 3/2018 | Lock et al. |
| 2019/0101702 A1* | 4/2019 | Li .......................... G02B 6/381 |

* cited by examiner

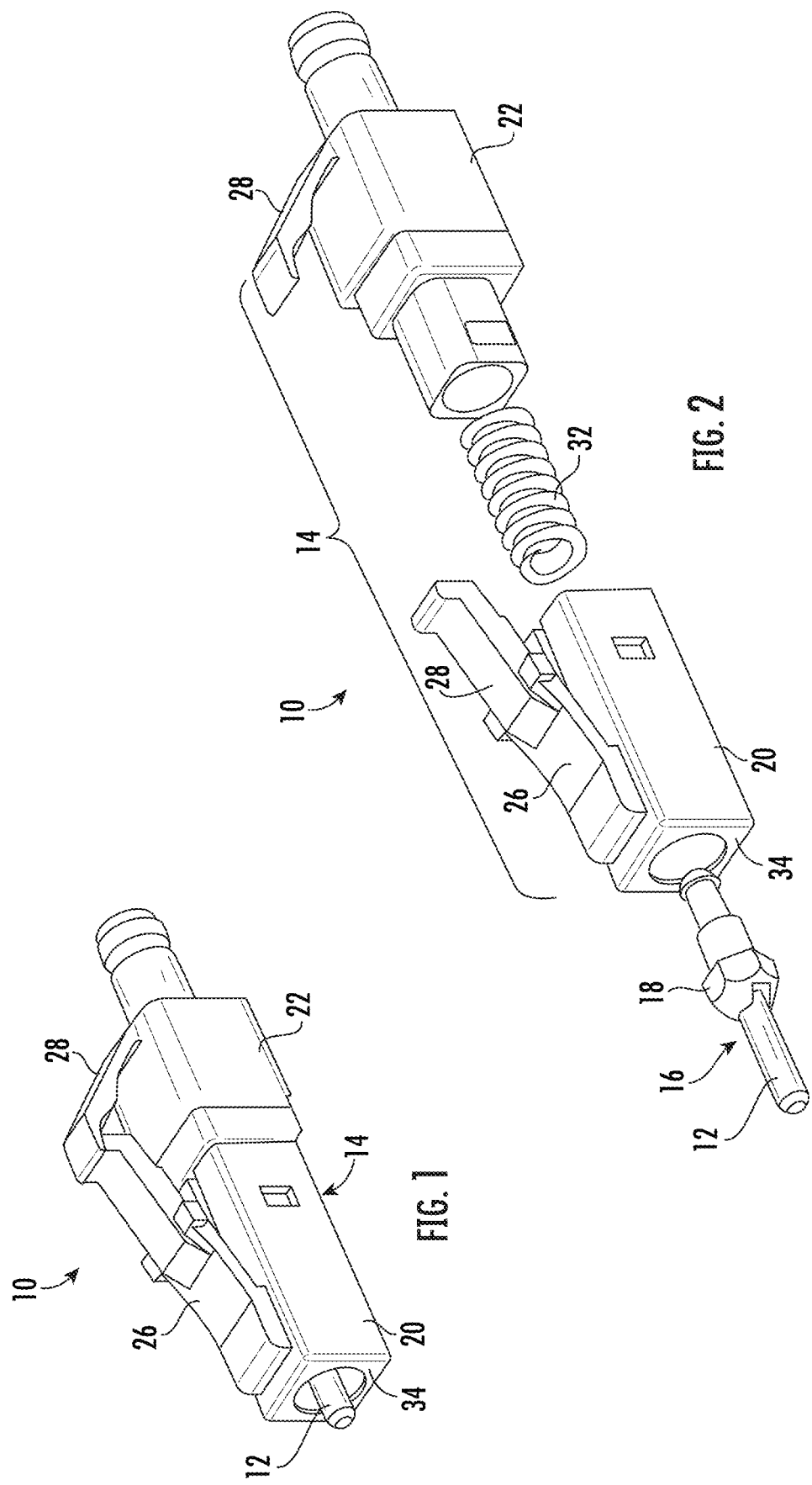

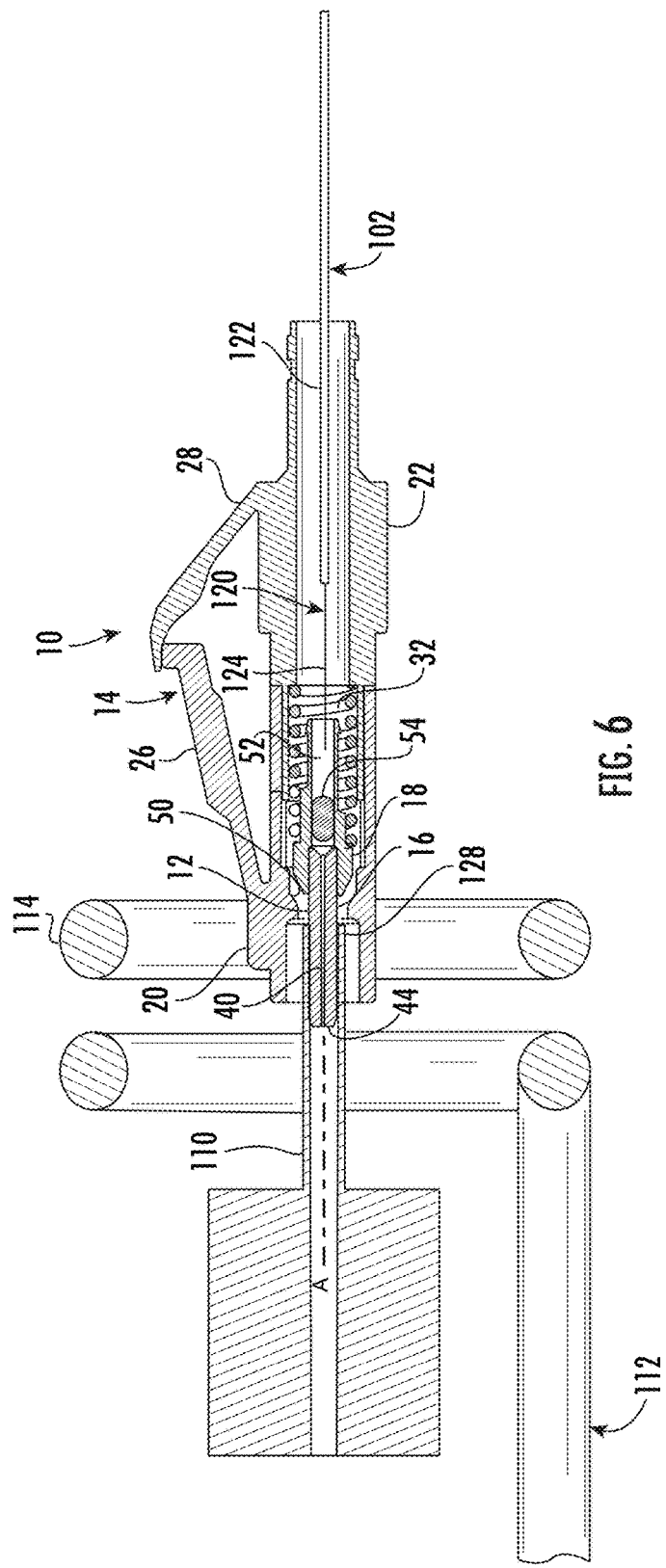
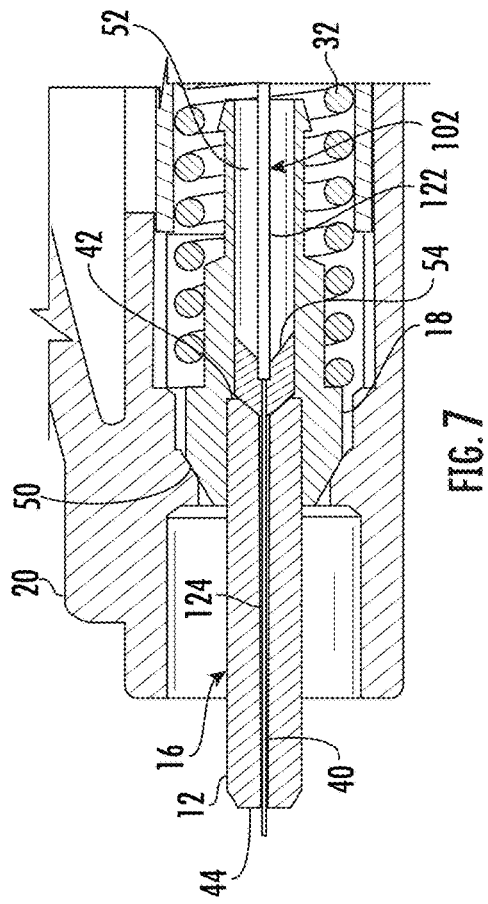
FIG. 6
FIG. 7

OPTICAL FIBER ASSEMBLIES AND METHODS OF FORMING THE SAME

PRIORITY APPLICATION

This application claims the benefit of priority of U.S. Provisional Application No. 63/284,086, filed on Nov. 30, 2021, the content of which is relied upon and incorporated herein by reference in its entirety.

BACKGROUND

This disclosure relates generally to optical connectivity, and more particularly to methods of forming an optical fiber assembly using an induction heating device, along with the optical fiber assemblies resulting from such methods.

Optical fibers are useful in a wide variety of applications, including the telecommunications industry for voice, video, and data transmissions. In a telecommunications system that uses optical fibers, there are typically many locations where fiber optic cables that carry the optical fibers connect to equipment or other fiber optic cables. To conveniently provide these connections, fiber optic connectors are often provided on the ends of fiber optic cables. The process of installing connectors on the ends of optical fibers is known as "termination," since the ends of the optical fibers are terminated with the connectors. The term "connectorization" is sometimes used to refer to this process as well. Termination can be done in a factory, resulting in a "pre-connectorized" or "pre-terminated" fiber optic cable, or the field (e.g., using a "field-installable" or "field mount" fiber optic connector).

Regardless of where termination occurs, a fiber optic connector typically includes a ferrule with one or more bores that each receive an optical fiber. The ferrule supports and positions the optical fiber(s) with respect to a body of the connector. When the connector is inserted into an adapter to mate with another connector, a retention mechanism (e.g., latch) associated with the connector body engages the adapter to hold the connector in place. An alignment mechanism, such as a sleeve within the adapter, receives or otherwise positions the ferrule so that the optical fiber(s) in the ferrule can be aligned with the optical fiber(s) supported by a ferrule of the mating connector.

A ferrule can be used to position an optical fiber because the optical fiber is typically secured to the ferrule during the termination process. In particular, during termination, the optical fiber is inserted into the back of the ferrule bore and advanced to or past a front end of the ferrule. Adhesive is typically used to secure (bond) the optical fiber to the ferrule (e.g., in and/or behind the ferrule bore), to a ferrule holder that extends over and beyond a rear portion of the ferrule holder, or to both the ferrule and the ferrule holder. Different techniques for inserting and bonding optical fibers to ferrules are known. There is continuous interest in such techniques given their importance to termination processes and influence on cost, complexity, and ultimate performance.

One of the most common insert and bond techniques involves the use of epoxy. The epoxy is injected into a ferrule and/or ferrule holder immediately before or during inserting an optical fiber. Once cured, the epoxy provides a secure bond between the optical fiber and ferrule. The challenge with epoxy, however, can be the time required for such curing. It may take 5 to 10 minutes, or longer, to achieve sufficient curing for subsequent processing (e.g., cleaving and/or polishing the end of the optical fiber at the front end of the ferrule). The extended curing time can be partly offset by batch terminations, where multiple ferrules with epoxy and inserted optical fibers are cured simultaneously, but not all settings are conducive to such batch processing. Field terminations, for example, are typically limited to individual processing for practical reasons or because there is not a need for multiple terminations. Even some factory terminations may not desire batch processing out of consideration for other processing steps that may be easier or designed to accommodate individual processing.

One alternative adhesive to epoxy that has been used is a thermoplastic adhesive, also known as a "hot melt" adhesive. Such an adhesive can be stored in solid form, melted when needed to be processed in liquid form, and then allowed to set back into a solid form to bond surfaces that were brought into contact with the adhesive. For example, U.S. Pat. No. 4,984,865, discloses injecting a molten thermoplastic adhesive into a ferrule bore and then pushing an optical fiber through the ferrule bore so that the adhesive: (i) occupies space between the optical fiber and the ferrule bore, and (ii) forms a bead on the end the ferrule around a protruding portion of the optical fiber. U.S. Pat. No. 7,147,384 is similar but discloses further possibilities for storing a hot melt adhesive inside a connector prior to termination, different holt melt adhesive properties, and certain oven-based heating techniques. The melting and subsequent setting/solidifying of the adhesive may be faster compared to epoxy injection and cure times, but still takes over a minute.

Some adhesives have been proposed that provide even faster processing time than holt melt adhesives. For example, U.S. Pat. No. 8,696,215 discloses a particular adhesive based on a partially cross-linked resin (e.g., polyphenylene sulfide) that heats and cures in less than a minute. The adhesive may also be pre-loaded into the ferrule in a solid form. Although such adhesives may speed up processing, they require heating to relatively high temperatures (e.g., above 250° C.), which may be difficult to achieve based on where the adhesive is stored in the ferrule and potential nearby presence of other components (e.g., connector housing/body) that may not be designed withstand the high temperatures.

Despite the numerous approaches for inserting and bonding optical fibers to ferrules that are known, there remains an interest in new alternatives. Each known approach has its own challenges and may not be suitable for a given application, or at least leaves room for improvement when used for a given application.

SUMMARY

Methods of forming an optical fiber assembly are provided in this disclosure. The methods involve heating a ferrule holder and/or ferrule in a particular manner to facilitate the insertion and bonding of an optical fiber to the ferrule. During the inserting and bonding, the ferrule and ferrule holder may be part of an optical connector assembly that includes a connector body in which the ferrule holder is positioned. Alternatively, such a connector body may be installed after inserting and bonding an optical fiber to the ferrule.

To this end, according to one embodiment, the optical fiber assembly includes the ferrule and the ferrule holder. The ferrule has a front portion defining a front end, a rear portion defining a rear end, and a ferrule bore extending between the front end and the rear end. The ferrule bore may be in the form of a micro-bore, i.e. have a very small diameter (<127 μm), over a substantial majority (>80%) or all of the length of the ferrule. Such a ferrule design is common and often available at a lower cost compared to other ferrule bore geometries, such as those involving counterbore configurations and a shorter micro-bore. The ferrule holder receives the rear portion of the ferrule and together with the ferrule defines a ferrule assembly. The ferrule holder comprises metal and has a ferrule holder passage that communicates with the ferrule bore.

The method of forming the optical fiber assembly in this example embodiment comprises: placing an adhesive in the ferrule assembly, wherein the adhesive is placed in ferrule holder passage, the ferrule bore, or both the ferrule holder passage and the ferrule bore; heating the ferrule assembly through thermal induction, wherein the heating causes the adhesive to take or maintain a melted form; inserting an optical fiber into the ferrule bore during or after the heating step, wherein the temperature of the ferrule maintains the adhesive in the melted form during the inserting; and securing the optical fiber to the ferrule assembly using the adhesive, wherein the adhesive solidifies during the securing.

In some embodiments, the inserting step comprises inserting the optical fiber from the rear end of the ferrule and through the ferrule bore so that an end of the optical fiber extends to or past the front end of the ferrule, and the inserting step does not cause the adhesive to migrate to an end face of the ferrule that includes the front end.

In some embodiments, the adhesive is in a solid form at least initially during the placing step. A specific example is the adhesive comprising a monofilament of thermoplastic adhesive that is inserted into the ferrule holder passage, the ferrule bore, or both the ferrule holder passage and the ferrule bore.

In other embodiments, the optical fiber may be coated with the adhesive immediately prior to the inserting step such that the placing step and the inserting step occur simultaneously. One example of coating the optical fiber with the adhesive is dipping the optical fiber in a molten pool of the adhesive.

Thermoplastic adhesives may be particularly advantageous for use in methods and optical fiber assemblies according to this disclosure given their relatively low viscosities at reasonable temperature ranges and ability to cure relatively quickly. Other adhesives, however, are also possible. More generally, similar advantages may be obtained by adhesives that have: (a) a melt viscosity in the range of about 500 centipoise (cp) to about 20,000 cp in a temperature range from 150° C. to 300° C.; or (b) a shore D hardness of at least 60 at room temperature (23° C. for the purpose of this disclosure). Adhesives according to this disclosure may also include one or more additives, such as antioxidants, color concentrates, or viscosity modifiers to further provide desirable characteristics.

In some embodiments, the heating step may comprise: positioning the ferrule assembly relative to an induction coil; and causing electrical current to flow through the induction coil, wherein the electrical current generates a magnetic field that induces heat generation in the ferrule holder.

In some embodiments, the heating step may also comprise positioning a metal sleeve over the front portion of the ferrule. The metal sleeve remains positioned over the front portion of the ferrule when causing the electrical current to flow through the induction coil so that the electrical current induces heat generation in the metal sleeve. The metal sleeve may help transfer heat to the front portion of the ferrule so that the ferrule, which may comprise a ceramic material that is not efficiently heated by induction, still reaches a temperature sufficient to maintain the adhesive in a melted state during at least the inserting of the optical fiber.

Embodiments are also possible where a plurality of optical fiber assemblies are simultaneously formed by the heating step and the securing step, and where the heating step comprises positioning respective ferrule assemblies relative to the induction coil.

Additional features and advantages will be set out in the detailed description which follows, and in part will be readily apparent to those skilled in the technical field of optical connectivity. It is to be understood that the foregoing general description, the following detailed description, and the accompanying drawings are merely exemplary and intended to provide an overview or framework to understand the nature and character of the claims.

BRIEF DESCRIPTION OF THE DRAWINGS

The accompanying drawings are included to provide a further understanding and are incorporated in and constitute a part of this specification. The drawings illustrate one or more embodiment(s), and together with the description serve to explain principles and operation of the various embodiments. Features and attributes associated with any of the embodiments shown or described may be applied to other embodiments shown, described, or appreciated based on this disclosure.

FIG. 1 is a perspective view of one example of a fiber optic connector.

FIG. 2 is an exploded perspective view of the fiber optic connector of FIG. 1.

FIG. 6 is a cross-sectional side view of the arrangement of FIG. 4, but also showing an optical fiber being inserted into a back of the fiber optic connector.

FIG. 7 a cross-sectional side view illustrating adhesive securing the optical fiber of FIG. 6 to the fiber optic connector, after having inserted the optical fiber through the adhesive and through a ferrule of the fiber optic connector.

DETAILED DESCRIPTION

Figure 3:
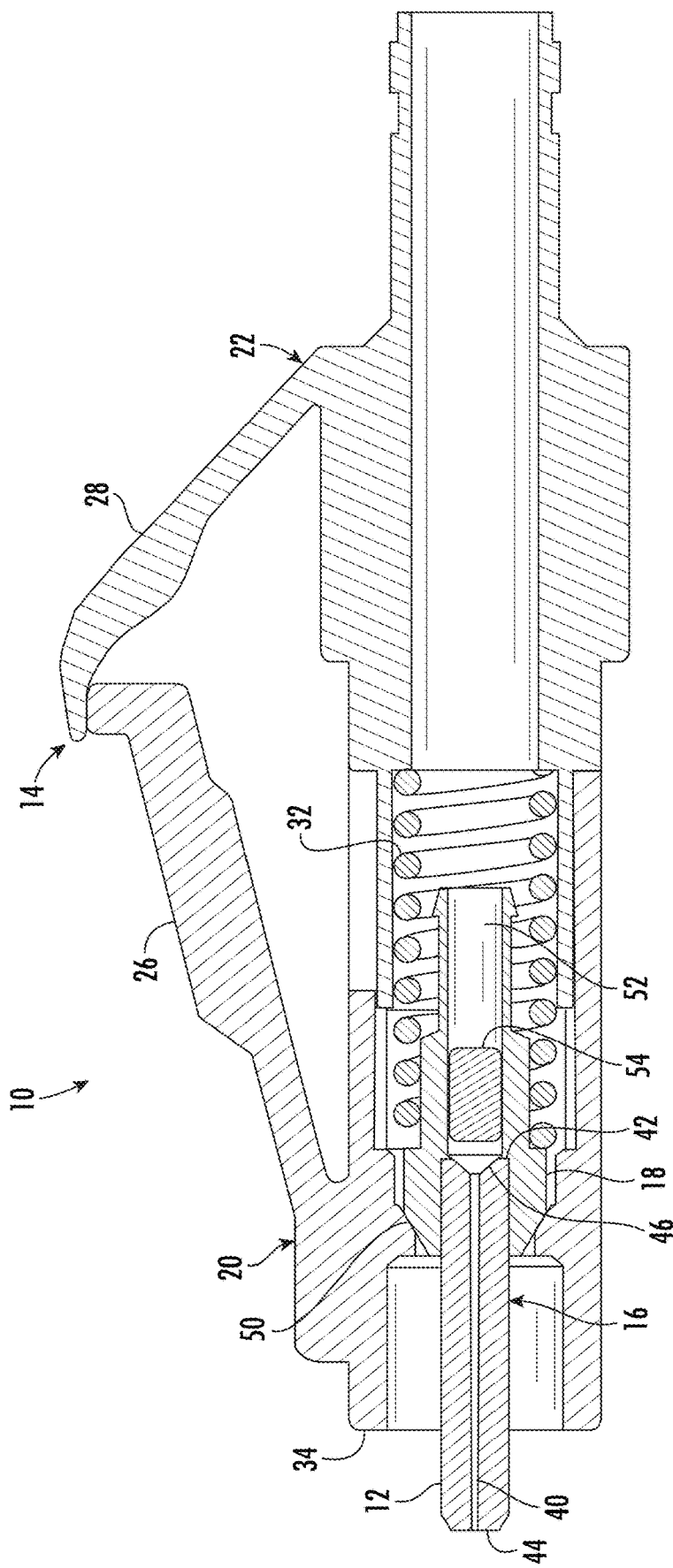
FIG. 3 is a cross-sectional side view of the fiber optic connector of FIG. 1, showing an adhesive pre-loaded into a ferrule holder of the fiber optic connector.

Various embodiments will be clarified by examples in the description below. In general, the description relates to optical fiber assemblies capable of being formed in short cycle times, along with methods for such forming. The optical fiber assemblies include an optical fiber secured relative to a ferrule, which may be part of or intended for use in a fiber optic connector. The methods use and process adhesives in a particular manner during an optical fiber termination process to result the optical fiber being secured to the ferrule. Examples will be described involving a single optical fiber being secured to a respective ferrule, but the disclosure is not limited to such examples. Aspects of this disclosure may also apply to ferrules for multi-fiber connectors, for example.

To this end, in the claims that follow the description below, the use of "a" or "an" in connection with an element (e.g., an optical fiber) refers to "one or more" of the element unless explicitly stated otherwise.

Also, in this disclosure, the term "fiber optic connector" refers to an assembly that includes a ferrule and a connector body, with the ferrule intended to facilitate the alignment of optical fibers for optical coupling, and with the connector body intended to facilitate mechanical coupling (e.g., to an adapter). Other components may be included as part of the assembly, but are not necessarily required in the claims that follow the description below. The terms "connector assembly", "connector sub-assembly", "optical connector", and "connector" are considered to be interchangeable with "fiber optic connector" in this disclosure.

Additionally, the term "nominal" as used in this disclosure with respect to a measurement or dimensional characteristic (e.g., diameter) refers to a stated or intended value of the characteristic. Actual values of the characteristic may be within acceptable manufacturing tolerances.

The term "heat deflection temperature" or "HDT" in this disclosure refers to values at 1.82 MPa according to ASTM D648 unless otherwise stated.

The term "monofilament" in this disclosure means that an adhesive has been melted, extruded, and cooled in some manner to result in a solid preform body. The term does not preclude post-processing following extrusion; a solid preform body with a substantially constant shape is all that is required.

A first example will now be described with the above principles in mind. As shown in FIGS. 1 and 2, the first example involves an optical connector 10 ("connector 10") in the form of a simplex LC connector (e.g., according to IEC 61754-20:2012). However, the description is not intended to be limited to any particular connector type and may instead apply to a wide variety of connector designs. These include simplex, duplex, and multifiber connector designs, for example. One specific example is a simplex SC connector (e.g., according to IEC 61754-4:2013).

The connector 10 includes a ferrule 12 configured to support an optical fiber (not shown in FIGS. 1 and 2) and a connector body 14 from which the ferrule 12 extends. More specifically, the ferrule 12 is part of a ferrule assembly 16 that also includes a ferrule holder 18 received over a rear portion of the ferrule 12. The connector body 14 includes a front connector body 20 in which the ferrule holder 18 is positioned and a rear connector body 22 coupled to a back of the front connector body 20. Thus, in the embodiment shown, the connector body 14 is a two-piece connector body, but embodiments are also possible with a one-piece connector body. Additionally, the term "connector body" in this disclosure may be interchangeable with "connector housing".

The front connector body 20 includes a latch arm 26 that extends outward and rearward from a front portion of the front connector body 20. The latch arm 26 is configured to flex toward other portions of the front connector body 20 to allow the connector 10 to be inserted into and removed from an adapter (not shown), dust cap (not shown), and/or other structure or component. The rear connector body 22 includes a trigger arm 28 (also referred to as "actuation arm") that may be depressed by a user to cause the latch arm 26 to flex toward the front connector body 20. The trigger arm 28 is optional, as other embodiments may include a different type of rear connector body or a single connector body, as mentioned above.

Still referring to FIGS. 1 and 2, a spring 32 seated within the rear connector body 22 extends into the front connector body 20 and biases the ferrule holder 18 to a forward position in the front connector body 20. Internal geometry of the front connector body 20 defines a stop for the ferrule holder 18 in the forward position, thereby retaining the ferrule holder 18 in the front connector body 20. The ferrule 12 extends from the ferrule holder 18 and has a front portion that projects beyond a forward end 34 of the front connector body 20.

The relationship between the ferrule assembly 16 and the connector body 14, and additional details of components themselves, can be better appreciated with reference to FIG. 3. As shown in FIG. 3, the ferrule 12 includes a ferrule bore 40 extending between a rear end 42 of the ferrule 12 and a front end 44 of the ferrule 12. The ferrule bore 40 includes a tapered lead-in portion 46 extending from the rear end 42 but is otherwise small in diameter compared to the ferrule 12 itself. This small-diameter portion of the ferrule bore 40 may be referred to as a micro-hole or micro-bore, and is typically designed to be close in size to the nominal diameter of an optical fiber that the ferrule 12 is intended to terminate. As an example, for an optical fiber having a nominal diameter of 125 μm, the micro-hole portion of the ferrule bore 40 may have a diameter of 127 μm or less, 126 μm or less, or even 125.5 μm or less. In the example shown, the micro-hole represents the vast majority of the ferrule bore 40. In some embodiments the micro-hole may extend over a length that is at least 80% of an overall length of the ferrule 12 (between the front end 44 and the rear end 42), at least 85% of the overall length of the ferrule 12, or at least 90% of the overall length of the ferrule 12.

The ferrule holder 18 is received over the rear portion of the ferrule 12 and abuts an inner surface 50 of the front connector body 20 when the ferrule holder 18 is in the forward position. A portion of the ferrule holder 18 extends behind the ferrule 12 and includes a ferrule holder passage 52 that communicates with the ferrule bore 40. In the example shown, the ferrule assembly 16 includes an adhesive 54 placed within the ferrule holder passage 52. The adhesive 54 is shown schematically in FIG. 3 and intended to represent a solid slug of material. The adhesive 54 may be placed in the ferrule assembly 16 in this solid form prior to or during a termination process for an optical fiber. In other words, the adhesive 54 may be pre-loaded in the ferrule holder passage 52 prior to beginning a termination process, or loaded into the ferrule holder passage 52 as a step in a termination process. In certain embodiments, the adhesive 54 may be provided as a monofilament. This means that the adhesive has been melted, extruded, and cooled in some manner to result in a solid preform/body. Initially such extrusion may result in an elongated solid preform, which may then be cut into shorter lengths for use in respective optical assemblies. Although FIG. 3 illustrates the adhesive 54 only placed in the ferrule holder passage 52, in alternative embodiments the adhesive 54 may be placed only in the ferrule bore 40, or both in the ferrule holder passage 52 and the ferrule bore 40. Additional details about the adhesive 54 and alternatives to these examples are described in further detail below.

Having generally described the connector 10, an example method of forming an optical fiber assembly that includes the connector 10 will now be described. The optical fiber assembly is the result of a termination process, i.e. a process of terminating an optical fiber with components (e.g., some or all of the components of the connector 10). The process uses thermal induction to heat the ferrule assembly 16 and melt the adhesive 54. In alternative embodiments where the adhesive 54 is not pre-loaded and instead injected or otherwise placed into the ferrule assembly 16 in a molten (liquified) form, the process may be used to maintain such molten form during other steps. An optical fiber 102 (FIG. 6) is inserted into the ferrule assembly 16 and advanced through the molten adhesive and into the ferrule bore 40, as will be described in further detail below.

Figure 4:
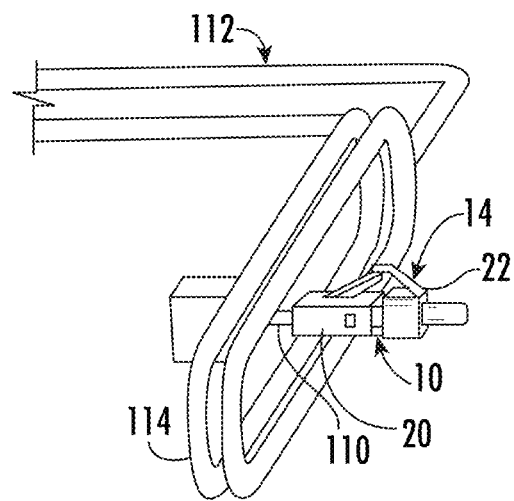
FIG. 4 is a perspective view of an arrangement where the fiber optic connector of FIG. 1 is positioned relative to an induction heating device.
Figure 5:
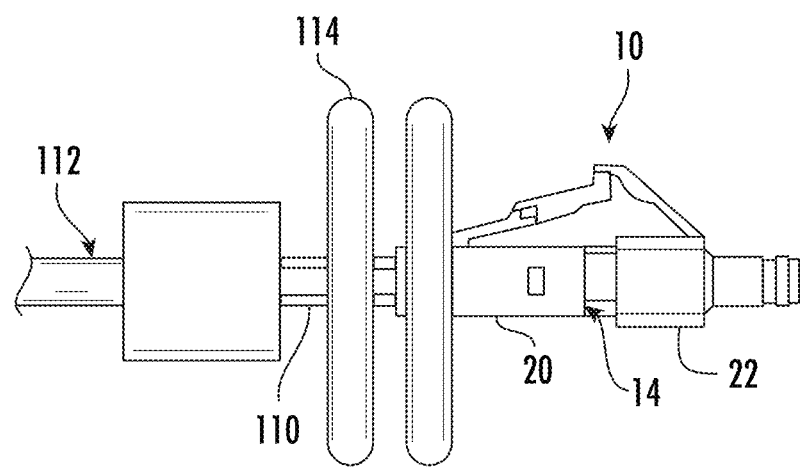
FIG. 5 is a side view of the arrangement of FIG. 4.

To this end, FIGS. 4-6 illustrate the connector 10, a sleeve 110, and an induction heating device 112 being positioned relative to each other. The sleeve 110 is received over the front end 44 of the ferrule 12, yet is small enough in size to also extend along the front portion of the ferrule 12 and into space between an outer surface of the ferrule 12 and an inner surface of the front connector body 20. The connector 10 and the sleeve 110 are arranged so that the ferrule assembly 16 and the sleeve 110 reside on an axis A that extends through an induction coil 114 of the induction heating device 112. In other words, the sleeve 110, the ferrule assembly 16, or both are at least partially situated within the induction coil 114. The sleeve 110 and the connector 10 may be supported by respective fixtures (not shown), whose position may be controlled by suitable equipment to result in the arrangement shown in FIGS. 4-6.

In some embodiments, the ferrule holder 18 is comprised of metal. This enables the induction heating device 112 to efficiently heat and melt the adhesive 54 that was placed in the ferrule holder passage 52. More specifically, the induction heating device 112 may be used to generate current flow through the induction coil 114. The current flow, in turn, generates a magnetic field that excites electrons in the ferrule holder 18 and cause them to heat up, consistent with induction heating principles. This heat then causes the adhesive 54 to melt (i.e., have a molten form). In embodiments where the adhesive 54 is already in a molten form when placed in the ferrule holder passage 52, the heat from the ferrule holder 18 maintains the adhesive 54 in the molten form. The molten form of the adhesive 54 allows the optical fiber 102 to be inserted through the adhesive 54.

To this end, FIG. 6 illustrates the optical fiber 102 being inserted into the connector 10 from the back side of the rear connector body 22. The optical fiber comprises a strand of glass 120 surrounded by one or more polymer coatings 122 (e.g., acrylate). The coating(s) 122 are removed from an end section of the optical fiber 102 to result in a "bare" glass end section 124, as is conventional for optical fiber termination processes. Once the adhesive 54 is in a molten form from the induction heating step described above, the glass end section 124 can be advanced through the adhesive 54 and into the ferrule bore 40. The adhesive 54 may move with the optical fiber 102 toward the rear end 42 of the ferrule 12. Additionally, some of the adhesive 54 may be pulled into the ferrule bore 40 to occupy space between the glass end section 124 and the ferrule bore 40. The result after the optical fiber 102 is fully inserted for the process may look like FIG. 7, which illustrates the adhesive 54 surrounding the optical fiber 102 adjacent the rear end 42 of the ferrule 12, within the ferrule holder passage 52. The adhesive 54 occupying space between the optical fiber 102 and the ferrule bore 40 is not illustrated due to the level of detail in the drawing. Ultimately the adhesive 54 cools and solidifies, at which point the optical fiber 102 becomes secured to the ferrule assembly 16, and specifically the ferrule 12, by the adhesive 54. The cooling may be achieved passively, simply by allowing the adhesive 54 to return to room temperature. Alternatively, to accelerate curing time, active cooling techniques may be used.

The sleeve 110 may serve several purposes during the steps described above. For example, in some embodiments, the sleeve 110 may be comprised of metal to assist with the heating process described above. Operating the induction heating device 112 causes both the ferrule holder 18 and the sleeve 110 to heat up in such embodiments given the position of these components relative to the induction coil 114. Heating the sleeve 110 helps heat the front portion of the ferrule 12 that is surrounded by the sleeve 110. Indeed, the sleeve 110 may be closely received over the front portion of the ferrule 12 to provide more efficient heat transfer to the ferrule 12 (e.g., by radiation). With the sleeve 110 heating the front portion of the ferrule 12, and the ferrule holder 18 heating the rear portion of the ferrule 12, the ferrule 12 can be heated more uniformly/consistently. This can make it easier and quicker to bring relevant portions of the ferrule 12 to temperatures sufficient to maintain the adhesive 54 in a melted form when inserting the optical fiber 102 through the ferrule bore 40. If, for example, the front portion of the ferrule 12 were not maintained at such temperatures, there is a risk that adhesive 54 in the ferrule 12 (e.g., if placed there initially and/or pulled in by the optical fiber 102) may solidify before the optical fiber is fully inserted. This may prevent the full insertion or introduce characteristics that adversely affective bonding strength/performance. In embodiments where the micro-hole represents a substantial majority of the ferrule bore 40, controlling the temperature to maintain the molten form of the adhesive 54 during the optical fiber insertion is especially advantageous. Additionally, the induction heating device 112 can heat the sleeve 110 and ferrule holder 18 quickly, and thereby melt the adhesive 54 quickly, such that the time associated with the heating steps can be reduced compared to other techniques.

Furthermore, in some embodiments, the sleeve 110 may be used to push the ferrule assembly 16 rearward relative to the connector body 14, prior to and/or during operation of the induction heating device 112. This may be achieved by the sleeve 110 being sized to fit through an opening 128 in the front connector body 20 that is larger than the ferrule 12 yet smaller than the ferrule holder 18, thereby allowing the sleeve 110 to be advanced to push the ferrule holder 18 rearward. In other embodiments, the sleeve 110 may be sized to grip or otherwise engage the ferrule 12 to push the ferrule 12 (and, therefore, the ferrule holder 18) rearward. An advantage of moving the ferrule holder 18 away from its forward position is that the ferrule holder 18 no longer contacts the inner surface 50 of the front connector body 20. The front connector body 20 is typically comprised of a molded polymer material, such as Ultem® 1010, and may not be able to adequately withstand the same temperatures as metal components like the ferrule holder 18. Temperatures needed to melt the adhesive 54 in the ferrule 12 may have the potential to deform the front connector body 20. Thus, by moving the ferrule holder 18 out of contact with the inner surface 50 of the front connector body 20 before operating the induction heating device 112 (and maintaining the space when operating the induction heating device 112), there is less risk of heat from the ferrule holder 18 causing damage to the front connector body 20.

Some embodiments according to this disclosure may even involve heating the ferrule assembly 16 to a temperature above a heat deflection temperature of the connector body 14. Using the connector 10 as an example, the front connector body 20 may comprise a molded polymer material that has a certain heat deflection temperature (HDT) at 1.82 MPa measured according to ASTM D648. Due to the quick, focused heating by the induction heating device 112, and the ferrule assembly 16 not contacting the front connector body 20 during the heating, the ferrule assembly 16 may be heated to a temperature above the HDT of the front connector body 20. This means that, if desired, the adhesive 54 may be selected from a material that has a melting point above the HDT of the front connector body 20. In some embodiments, the melting point of the adhesive 54 may be greater than the HDT of the front connector body 20 by at least 10° C., at least 20° C., at least 30° C., at least 50° C., or more. Thus, in embodiments where the front connector body 20 comprises a material like Ultem® 1010, which has a HDT of 213° C., it is possible to use a material for the adhesive 54 that has a melting point above 213° C., above 220° C., above 250° C., etc. This principle may be extended to allow for the use of less expensive materials for the connector body 14 that have lower HDTs. For example, embodiments are possible where the front connector body 20 comprises a material like polybutylene terephthalate (e.g., Ultradur® B 4300 G3 from BASF SE, Ludwigshafen, Germany), which has a HDT of 185° C. The adhesive 54 in such embodiments may have a melting point above 185° C., above 200° C., above 220° C., above 250° C., etc.

Regardless of the HDT of the connector body 14 and the melting point of the adhesive 54, the sleeve 110 may also be used as part of an active cooling step. For example, after operating the induction heating device 112 and inserting the optical fiber 102 to the desired position, the sleeve 110 may be used to deliver pressurized air or other gas to the ferrule 12. The forced convention may accelerate the dissipation of heat from the ferrule 12, which in turn allows the adhesive 54 to cure/solidify faster. The fast curing facilitates also faster cycle times, which can be advantageous when methods according to this disclosure are used to form large volumes of optical fiber assemblies.

Although additional advantages that may result from using the sleeve 110 are mentioned above, this disclosure is not limited to embodiments using the sleeve 110. In other words, methods according to this disclosure are possible where the ferrule assembly 16 is sufficiently heated by an induction coil without needing a sleeve positioned over the ferrule 12.

Now referring more generally to the adhesive 54 in the steps described above, persons skilled in optical connectivity will appreciate that the adhesive 54 comprises a polymer material that can be melted and/or maintained in a melted form by the induction-heated ferrule holder 18. Thermoplastic hot melt adhesives may be particularly advantageous because of their melt viscosities, relatively quick curing times, and bonding strengths. Examples of such a hot melt adhesive are TECHNOMELT® PA 2692 from Henkel Corporation and UNI-REZ™ 2626 from Kraton Corporation (Houston, Texas, United States). Various other hot melt adhesives are disclosed in U.S. Pat. Nos. 4,984,865 and 7,147,384, the disclosures of such adhesives being incorporated herein by reference. As noted in U.S. Pat. No. 7,147,384, suitable hot melt adhesives for optical fiber connectors may comprise polyamide or another polymer material having one or more of the following properties: (a) a melt viscosity of 1,000 to 20,000 centipoises (cp) in a working temperature range of 210° C. to 250° C.; (b) a Shore D hardness of 50 to 85 at room temperature; or (c) 15% to 35% crystallinity in the adhesive to provide superior adhesive stability in fiber optic connectors.

In some embodiments according to this disclosure, the adhesive 54 may be in the form of a monofilament when placed in the ferrule holder 18. Many adhesives, especially polyamide-based thermoplastic adhesives are readily available in monofilament form. A short length of monofilament may be cut from a reel or the like and inserted into the ferrule holder passage 52 (FIG. 3) before or as part of a termination process. For example, a monofilament that is about 2 mm in length and about 1 mm in diameter may be cut from a reel and placed in the ferrule holder passage 52 adjacent the rear end 42 of the ferrule 12. When the induction heating device 112 is operated, the ferrule holder 18 can be quickly heated to temperatures above the melting point of the adhesive 54 due to the metal construction of the ferrule holder 18. As a result, the monofilament of the adhesive 54 within the ferrule holder passage 52 can be quickly melted.

In other embodiments according to this disclosure, and as briefly referenced earlier, the adhesive 54 may already be in a molten form when placed into the ferrule assembly 16. For example, the adhesive 54 may be melted and injected into the ferrule holder passage 52 prior to inserting the optical fiber 102 into the ferrule assembly 16. Alternatively, the adhesive 54 may be applied to the glass end section 124 of the optical fiber 102 before inserting the optical fiber 102 into the ferrule assembly 16. For example, the adhesive 54 may be applied by dipping the optical fiber 102 into a molten pool of the adhesive 54 before inserting the optical fiber 102, or by spraying molten adhesive 54 onto the glass end section 124 before inserting the optical fiber 102. In such embodiments the optical fiber 102 carries the adhesive 54 into the ferrule holder passage 52 and ultimately at least some portion of the ferrule bore 40. Thus, the steps of placing the adhesive 54 in the ferrule assembly 16 and inserting the optical fiber 102 occur simultaneously. The different techniques for placing the adhesive 54 into the ferrule assembly 16 are not necessarily mutually exclusive, as multiple techniques may be used in some embodiments, if desired.

Additionally, certain aspects of this disclosure may be applicable to adhesives other than thermoplastic hot melt materials. For example, the types of adhesives disclosed in U.S. Pat. No. 8,696,215, which is referenced in the Background section above, including polyphenylene-sulfide (PPS)-based adhesives as an example, may be used in some embodiments. The ferrule assembly 16 may still be heated with the induction heating device 112 in the same manner as described above.

Figure 10:
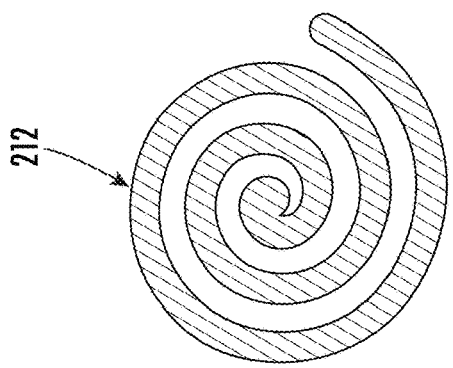
FIG. 10 is top view of the induction heating device of FIG. 9.
Figure 9:
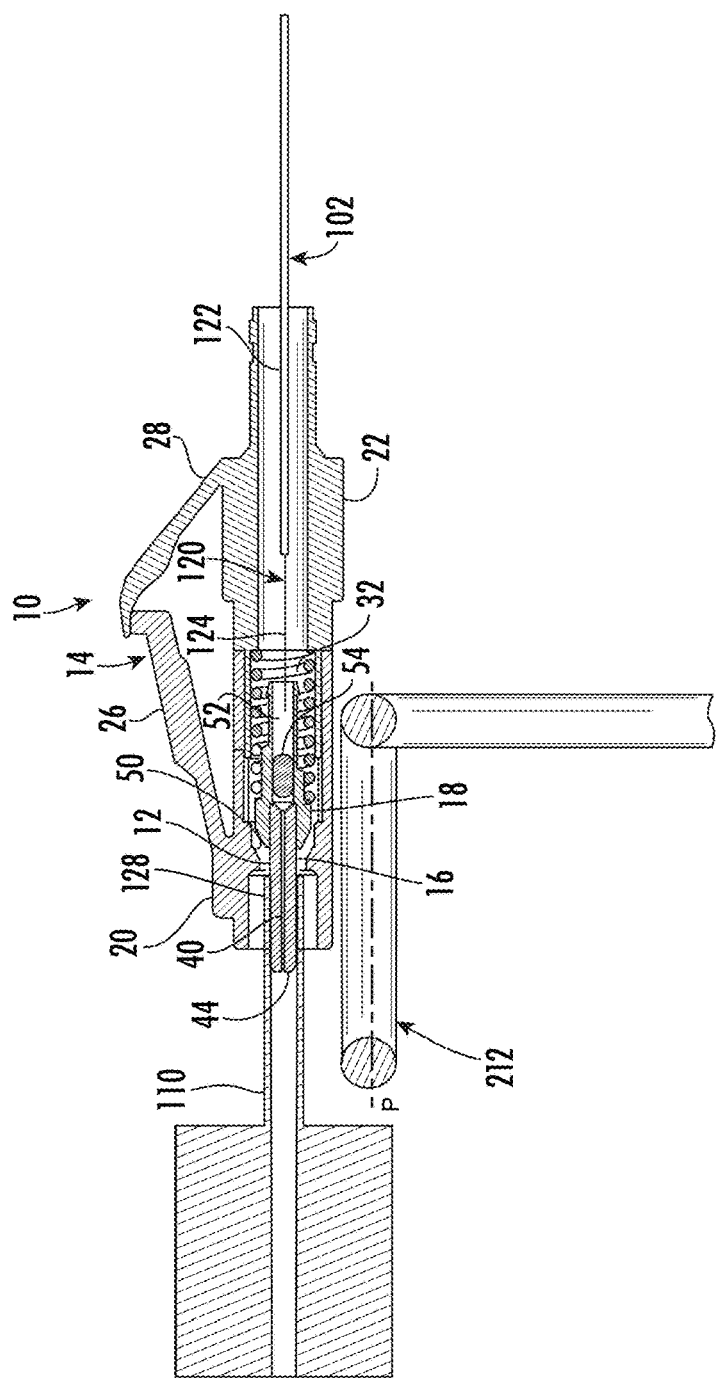
FIG. 9 is a cross-sectional side view of the fiber optic connector of FIG. 1 positioned relative to an induction heating device according to an alternative embodiment.

In general, adhesives with one or more of the following properties may be particularly suited for methods according to this disclosure: (a) a melt viscosity of 500 to 20,000 cp in a working temperature range of 150° C. to 300° C.; or (b) a Shore D hardness of at least 60 at room temperature. In some embodiments, adhesives may include one or more additives that help provide desirable processing characteristics. Example additives include but are not limited to antioxidants, color concentrates, and viscosity modifiers. Another possibility is for adhesives to include metallic particles, which may be particularly advantageous for methods according to this disclosure. For example, prior to extruding a melted adhesive to form a monofilament, the melted adhesive may be mixed with a metallic paste or the like so that the monofilament comprises metallic particles. When the monofilament adhesive is positioned in the ferrule holder 18 and/or ferrule 12 as described above and the induction heating device 112 is operated, the metallic particles can be heated by the magnetic field generated by the induction coil 114. This can lead to faster and more consistent melting of the adhesive when forming an optical fiber assembly. Even in embodiments where an adhesive is already in a molten form when placed into a ferrule assembly 16, the adhesive may be previously mixed with metallic particles to help maintain the molten form during operation of the induction heating device 112. FIG. 9 illustrates how the connector 10 and the sleeve 110 may be used with an induction heating device 212 according to an alternative embodiment. The induction heating device 212 still includes a coil 214, but the coil 214 has a spiral pattern generally located in a plane P. Although FIG. 10 illustrates the coil 214 in the shape of an Archimedes spiral, in other embodiments the spiral pattern of the coil may be different.

As shown in FIG. 9, the connector 10 and sleeve 110 are positioned adjacent the coil 214, generally parallel to the plane P, rather than being arranged to extend through the coil 214. The connector 10 can even be placed on the coil 214 in some embodiments. As was the case for the embodiment in FIGS. 4-6, the sleeve 110 and the connector 10 may be supported by respective fixtures (not shown), whose position may be controlled by suitable equipment to result in the arrangement shown in FIG. 9. Despite not being within the coil 214, the sleeve 110 and ferrule holder 18 may still be within a magnetic field generated by current flow through the coil 214. Thus, the coil 214 can function like the coil 212 and still cause the sleeve 110 and the ferrule holder 18 to heat up. The basic steps discussed above with reference to FIGS. 4-6 can still be performed with the induction heating device 212 to form an optical fiber assembly.

It will be apparent to those skilled in optical connectivity that various modifications and variations can be made based on this disclosure. For example, although the ferrule assembly 16 is shown in the figures and described above as being positioned within the connector body 14 when forming the optical fiber assembly, in alternative embodiments the ferrule assembly 16 may be processed independently to form an optical fiber assembly. In other words, the ferrule assembly 16 may be positioned relative to the induction heating device 112 and heated without the connector body 14 being present. After inserting and securing the optical fiber 102 to the ferrule assembly 16, the connector 10 can then be formed around the resulting optical fiber assembly. Specifically, the optical fiber assembly can then be assembled with the connector body 14 and potentially other components as part of assembling the connector 10. Processing the ferrule assembly 16 independently from assembling the connector 10 is an alternative way to keep the ferrule holder 18 spaced from an inner surface of the connector body 14 when operating the induction heating device 112.

Figure 8:
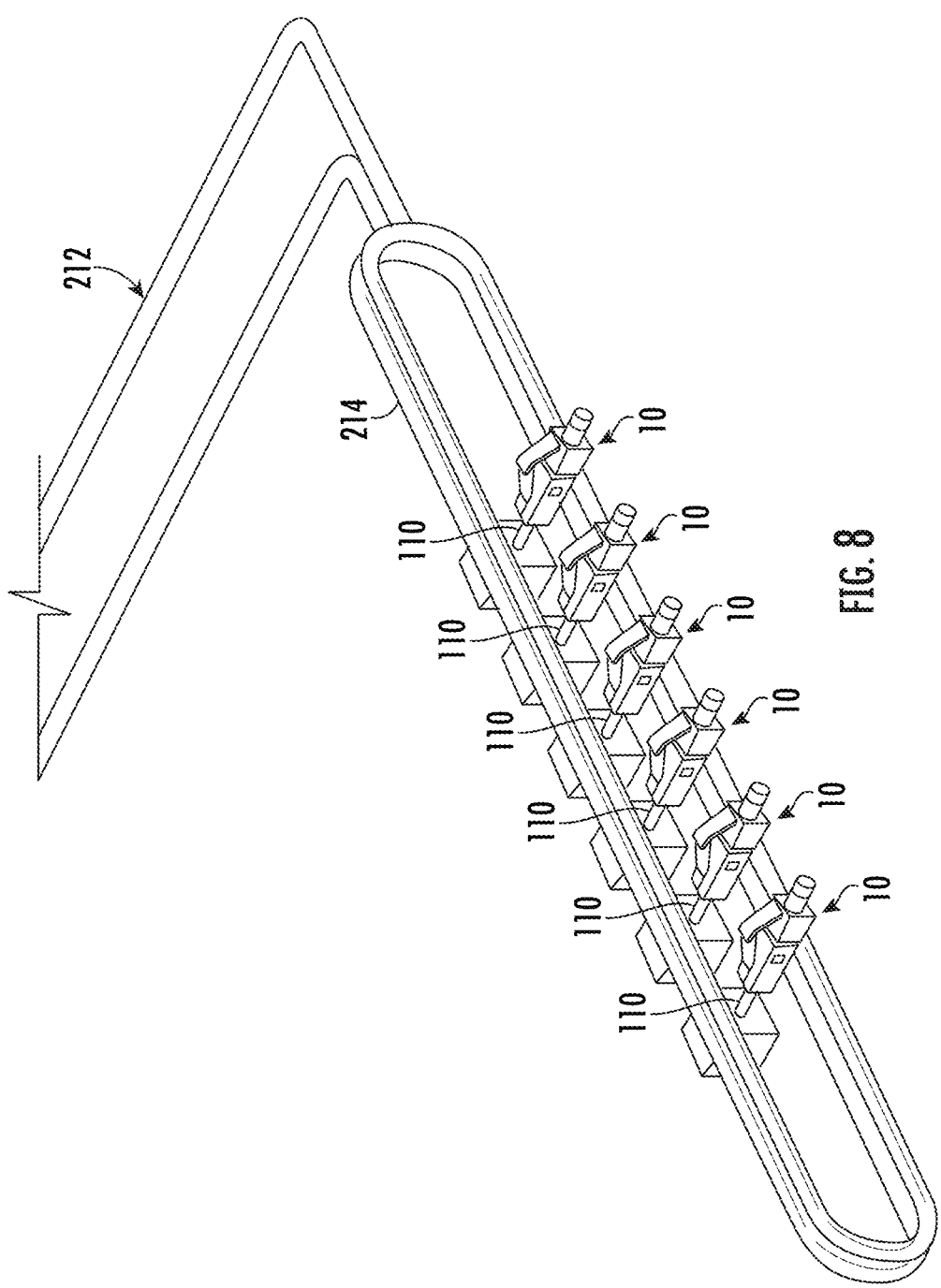
FIG. 8 is a schematic perspective view of a plurality of fiber optic connectors positioned relative to an induction heating device.

Additionally, although a single ferrule assembly 16 is described above as being heated by the induction heating device 112, in alternative embodiments multiple ferrule assemblies 16 may be heated simultaneously. For example, FIG. 8 illustrates multiple connectors 10 with respective ferrule assemblies 16 (FIGS. 2 and 3) being positioned relative to an induction coil 214 of an induction heating device 212. The induction coil 214 is shaped such that each of the ferrule assemblies 16 can reside within the induction coil 214. Additionally, each ferrule assembly 16 remains associated with a respective sleeve 110. When the induction heating device 212 is operated, the ferrule holder 18 of each ferrule assembly 16 is heated based on the same principles described above with respect to FIGS. 4-6. The ferrule 12 of each ferrule assembly 16 is also heated by way of the corresponding sleeve 110 in the same manner described above with respect to FIGS. 4-6.

The are many other alternatives and variations that will be appreciated by persons skilled in optical connectivity. For at least this reason, the invention should be construed to include everything within the scope of the appended claims and their equivalents.

What is claimed is:

1. A method of forming an optical fiber assembly, wherein the optical fiber assembly includes a ferrule and a ferrule holder, the ferrule having a front portion defining a front end, a rear portion defining a rear end, and a ferrule bore extending between the front end and the rear end, and wherein the ferrule holder receives the rear portion of the ferrule and together with the ferrule defines a ferrule assembly, the ferrule holder comprising metal and having a ferrule holder passage that communicates with the ferrule bore, the method comprising the steps of:

placing a thermoplastic adhesive in the ferrule assembly, wherein the thermoplastic adhesive is placed in ferrule holder passage, the ferrule bore, or both the ferrule holder passage and the ferrule bore;

heating the ferrule assembly through thermal induction, wherein the heating causes the thermoplastic adhesive to take or maintain a melted form, and wherein the heating comprises:

positioning the ferrule assembly relative to an induction coil and a metal sleeve that is separate from the induction coil, wherein the positioning includes receiving the front portion of the ferrule within the metal sleeve, and wherein the positioning results in the metal sleeve being positioned between the ferrule and the induction coil; and causing electrical current to flow through the induction coil, wherein the electrical current generates a magnetic field that induces heat generation in the ferrule holder to cause the thermoplastic adhesive to take or maintain a melted form, and wherein the metal sleeve remains positioned over the front portion of the ferrule when causing the electrical current to flow through the induction coil so that the electrical current induces heat generation in the metal sleeve;

inserting an optical fiber into the ferrule bore during or after the heating step, wherein the temperature of the ferrule maintains the thermoplastic adhesive in the melted form during the inserting; and securing the optical fiber to the ferrule assembly using the thermoplastic adhesive, wherein the thermoplastic adhesive solidifies during the securing.

2. The method of claim 1, wherein the inserting step comprises inserting the optical fiber from the rear end of the ferrule and through the ferrule bore so that an end of the optical fiber extends to or past the front end of the ferrule, and wherein the inserting step does not cause the thermoplastic adhesive to migrate to an end face of the ferrule that includes the front end.

3. The method of claim 1, wherein the thermoplastic adhesive is in a solid form at least initially during the placing step.

4. The method of claim 3, wherein the placing step comprises:

inserting a monofilament of the thermoplastic adhesive in the ferrule holder passage, the ferrule bore, or both the ferrule holder passage and the ferrule bore.

5. The method of claim 1, further comprising:

applying a coating of the thermoplastic adhesive to the optical fiber, wherein the placing step and the inserting step occur simultaneously.

6. The method of claim 5, wherein the coating of the thermoplastic adhesive is applied to the optical fiber by dipping the optical fiber in a molten pool of the thermoplastic adhesive.

7. The method of claim 1, wherein the ferrule has an overall length between the front end and the back end of the ferrule, and wherein the ferrule bore has a diameter less than 127 µm over a length that is at least 80% of the overall length of the ferrule.

8. The method of claim 1, wherein the induction coil has a helical pattern, and wherein the positioning of the ferrule assembly relative to the induction coil results in the ferrule assembly extending along on an axis that extends through the induction coil.

9. The method of claim 1, wherein the induction coil has a spiral pattern within a plane, and wherein the positioning of the ferrule assembly relative to the induction coil results in the ferrule assembly being positioned adjacent the induction coil outside of the plane.

10. The method of claim 1, wherein a plurality of optical fiber assemblies are simultaneously formed by the heating step and the securing step, and wherein the heating step comprises positioning respective ferrule assemblies relative to the induction coil.

11. The method of claim 1, wherein during at least the heating step, the ferrule assembly is part of an optical connector assembly that includes a connector body in which the ferrule holder is positioned.

12. The method of claim 11, wherein the optical connector assembly further includes a spring that biases the ferrule holder to a forward position against an inner surface of the connector body, and wherein the method further comprises:
moving the ferrule holder from the forward position to a retracted position, wherein the ferrule holder is maintained in the retracted position during at least the heating step.

13. The method of claim 11, wherein the connector body has a heat deflection temperature at 1.82 MPa according to ASTM D648, and wherein the heating step comprises heating the ferrule assembly above the heat deflection temperature of the connector body.

14. The method of claim 13, wherein the thermoplastic adhesive has a melting point at least 20° C. above the heat deflection temperature.

15. The method of claim 1, wherein the thermoplastic adhesive has a viscosity between 500 cP and 20,000 cP over a temperature range of 150° C. to 300° C.

16. The method of claim 1, wherein the thermoplastic adhesive has a shore D hardness of at least 60 at a temperature of about 23° C.

17. An optical fiber assembly formed by:
placing an adhesive in a ferrule assembly that includes a ferrule and a ferrule holder, wherein:
the ferrule has a front portion defining a front end, a rear portion defining a rear end, and a ferrule bore extending between the front end and the rear end,
the ferrule holder is received over the rear portion of the ferrule, comprises metal, and has a ferrule holder passage that communicates with the ferrule bore, and
the adhesive is placed in ferrule holder passage, the ferrule bore, or both the ferrule holder passage and the ferrule bore;
heating the ferrule assembly through thermal induction, wherein the heating causes the adhesive to take or maintain a melted form, and wherein the heating comprises:
positioning the ferrule assembly relative to an induction coil and a metal sleeve that is separate from the induction coil, wherein the positioning includes receiving the front portion of the ferrule within the metal sleeve, and wherein the positioning results in the metal sleeve being positioned between the ferrule and the induction coil; and
causing electrical current to flow through the induction coil, wherein the electrical current generates a magnetic field that induces heat generation in the ferrule holder to cause the adhesive to take or maintain a melted form, and wherein the metal sleeve remains positioned over the front portion of the ferrule when causing the electrical current to flow through the induction coil so that the electrical current induces heat generation in the metal sleeve;
inserting an optical fiber into the ferrule bore during or after the heating step, wherein the temperature of the ferrule maintains the adhesive in the melted form during the inserting; and
securing the optical fiber to the ferrule assembly using the adhesive, wherein the adhesive solidifies during the securing.

18. The optical fiber assembly of claim 17, wherein the ferrule has an overall length between the front end and the back end of the ferrule, and wherein the ferrule bore has a diameter less than 127 µm over a length that is at least 80% of the overall length of the ferrule.

19. An optical connector, comprising:
an optical fiber;
a ferrule terminating the optical fiber, wherein the ferrule has a front portion defining a front end, a rear portion defining a rear end, and a ferrule bore extending between the front end and the rear end;
a ferrule holder received over the rear portion of the ferrule, wherein the ferrule holder comprises metal and has a ferrule holder passage that communicates with the ferrule bore;
a connector body in which the ferrule holder is positioned, wherein the connector body comprises a polymer material having a heat deflection temperature at 1.82 MPa according to ASTM D648; and
an adhesive securing the optical fiber to the rear end of the ferrule and at least a portion of the ferrule bore, wherein the adhesive has a melting point above the heat deflection temperature of the connector body.

20. The optical connector of claim 19, wherein the adhesive has a melting point at least 20° C. above the heat deflection temperature of the connector body.

21. The optical connector of claim 19, wherein the heat deflection temperature of the connector body is less than 200° C.

* * * * *